(12) United States Patent
Tesoriero et al.

(10) Patent No.: US 9,243,652 B2
(45) Date of Patent: Jan. 26, 2016

(54) HYDRAULIC CIRCUIT

(71) Applicant: Parker-Hannifin Corporation, Cleveland, OH (US)

(72) Inventors: Anthony Tesoriero, Ann Arbor, MI (US); Carl Block, Columbiaville, MI (US)

(73) Assignee: Parker-Hannifin Corporation, Cleveland, OH (US)

( * ) Notice: Subject to any disclaimer, the term of this patent is extended or adjusted under 35 U.S.C. 154(b) by 70 days.

(21) Appl. No.: 14/163,049

(22) Filed: Jan. 24, 2014

(65) Prior Publication Data
US 2014/0202545 A1    Jul. 24, 2014

Related U.S. Application Data

(60) Provisional application No. 61/756,013, filed on Jan. 24, 2013.

(51) Int. Cl.
| | |
|---|---|
| *F15B 21/04* | (2006.01) |
| *B01D 19/00* | (2006.01) |
| *F16H 61/4174* | (2010.01) |
| *F15B 3/00* | (2006.01) |
| *F15B 21/14* | (2006.01) |
| *F16H 61/00* | (2006.01) |

(52) U.S. Cl.
CPC .......... *F15B 21/044* (2013.01); *B01D 19/0036* (2013.01); *B01D 19/0063* (2013.01); *F16H 61/4174* (2013.01); *F15B 3/00* (2013.01); *F15B 21/14* (2013.01); *F15B 2211/20538* (2013.01); *F15B 2211/212* (2013.01); *F15B 2211/625* (2013.01); *F16H 2061/004* (2013.01); *Y10T 137/0318* (2015.04); *Y10T 137/85978* (2015.04)

(58) Field of Classification Search
CPC   B01D 19/0036; B01D 19/0063; F15B 21/04; F15B 21/044; F15B 2211/63; F15B 2211/85; F15B 2211/611; F15B 2211/655
USPC ............... 95/1, 12; 96/156, 195, 200; 60/453; 210/120, 130, 137, 168, 472
See application file for complete search history.

(56) References Cited

U.S. PATENT DOCUMENTS

| | | | | |
|---|---|---|---|---|
| 3,972,342 | A | * | 8/1976 | Jackson ........................ 137/110 |
| 5,307,572 | A | * | 5/1994 | Engel ................................ 38/43 |
| 5,772,868 | A | * | 6/1998 | Reinhardt ..................... 210/120 |
| 2014/0083290 | A1 | * | 3/2014 | Larson ............................. 95/12 |

\* cited by examiner

*Primary Examiner* — Robert A Hopkins
*Assistant Examiner* — Minh-Chau Pham
(74) *Attorney, Agent, or Firm* — Renner, Otto, Boisselle & Sklar, LLP (57) ABSTRACT

A de-aeration hydraulic circuit having application in a hydro-mechanical transmissions utilizes a hydraulic fluid reservoir to de-aerate hydraulic fluid. The circuit includes a high pressure side and a low pressure side having a bleed down valve therebetween, the opening of the bleed down valve causing fluid to flow from the high pressure side to the low pressure side and through a valve to the hydraulic fluid reservoir where the pressure drop causes gas that is entrained in the fluid to bubble out and vent from the atmospheric reservoir.

20 Claims, 8 Drawing Sheets

HYDRAULIC CIRCUIT

CROSS REFERENCE TO RELATED
APPLICATIONS

This application claims the benefit of the filing date of U.S. Provisional Patent Application Ser. No. 61/756,013, filed Jan. 24, 2013, the disclosure of which is incorporated herein by reference in its entirety.

TECHNICAL FIELD

The present invention relates to hydraulic circuits (also called hydraulic systems). More specifically, the invention relates to a hydraulic circuit for removing gas from the hydraulic fluid used in the circuit. Still more specifically, the invention relates to such a circuit that charges the low pressure side of the circuit on start up and that removes gas from the hydraulic fluid on shut down. Still more specifically, the invention relates to such a circuit for use with a hydromechanical transmission.

BACKGROUND

Hydromechanical transmissions, including hydromechanical powersplit transmissions, are used in hydraulic hybrid vehicles. Such vehicles may include a vehicle prime mover such as an internal combustion engine, at least one hydraulic pump motor unit, a gear set such as a planetary gear set, and an output shaft connecting the planetary gear set to a drive shaft of the vehicle. The internal combustion engine and the hydraulic pump motor unit are connected to the gear set, and the gear set splits power from the internal combustion engine and from the hydraulic pump motor unit in a motoring mode to rotate the drive shaft and propel the vehicle. The pump motor unit may also be used in a pumping mode to capture energy under certain conditions such as braking the vehicle, and the captured energy may be stored in an energy storage device such as a hydraulic accumulator to power the hydraulic pump motor unit in the motoring mode.

Hydraulic circuits, including hydraulic circuits used in hydromechanical transmissions and elsewhere, usually have some amount of gas dissolved in or entrained in the hydraulic fluid. This gas may be, for example, air from the atmosphere or nitrogen that permeates through the bladder of a known nitrogen bladder type accumulator and into the hydraulic fluid.

Gas that is dissolved in or entrained in hydraulic fluid in a hydraulic circuit can cause various known problems, including noise, reduced component response due to spongy behavior of aerated fluids, cavitation damage and fluid degradation. The present invention addresses this technical problem and provides a de-aerating hydraulic circuit and method that removes gas from the hydraulic fluid of the circuit. The circuit and method according to the present invention also charges a low pressure side of the circuit at start up. Further, the circuit and method according the present invention then de-aerates the hydraulic fluid by flow from the high pressure side to the low pressure side and from the low pressure side to the atmospheric or low pressure reservoir.

BRIEF DESCRIPTION OF THE DRAWINGS

Embodiments of this invention will now be described in further detail with reference to the accompanying drawings, in which.

DETAILED DESCRIPTION OF THE DRAWINGS

Figure 1:
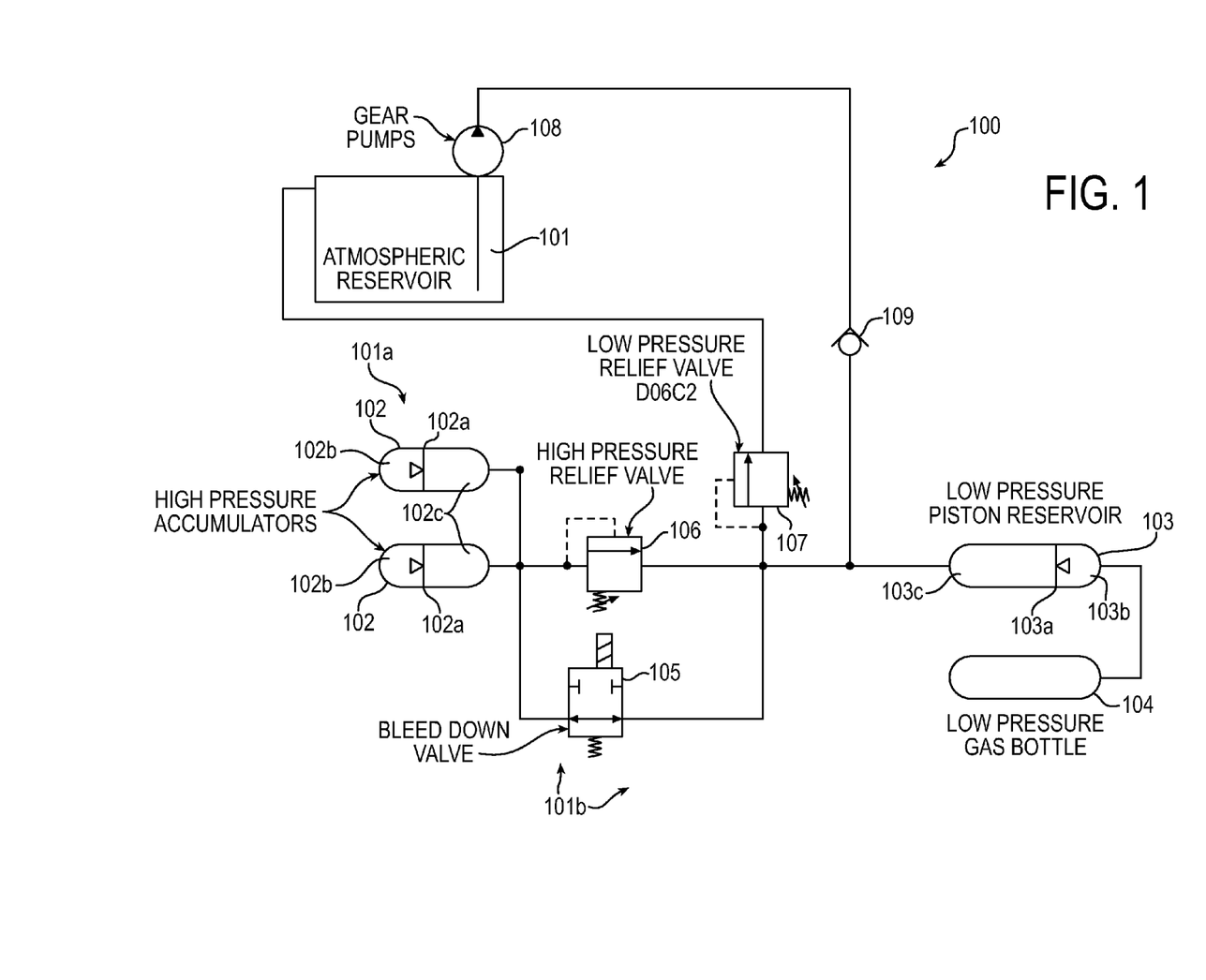
FIG. 1 is a schematic diagram of a first embodiment of a hydraulic circuit of the present invention.

FIG. 1 illustrates a hydraulic circuit 100 that may be used in various applications, including with a hydromechanical transmission of the general type illustrated in U.S. Provisional Patent Application Ser. No. 61/641,467 filed May 2, 2012 and those Patent Applications that reference such Patent Application for filing date purposes, the disclosures of which are incorporated herein by refer in their entirety. The circuit 100 includes a hydraulic fluid reservoir 101 at atmospheric pressure, high pressure hydraulic accumulators 102 each having a divider 102a such as a flexible bladder to separate a gas side 102b of the accumulator from a hydraulic fluid side 102c, a low pressure piston reservoir or accumulator 103 having a divider 103a such as a movable piston to separate a gas side 103b of the accumulator from a hydraulic side 103c, a low pressure gas bottle 104 for maintaining a gas pressure on the gas side 103b, an electrically actuated bleed down valve 105 having a dosed position and an opened position, a high pressure relief valve 106, a low pressure relief valve or de-aerating valve 107 having a dosed position and a restricted flow opened position, a pump 108 such as for example a gear pump driven for example by an electric motor (not shown) or alternatively by the engine (not shown) of the vehicle, and a check valve 109. The circuit 100 has a high pressure side 100a, which includes the high pressure accumulators 102 and those portions of the circuit 100 upstream of the valves 105 and 106 that are at the high pressure operating pressure of the circuit. The circuit 100 also has a low pressure side 100b, which includes those portions of the circuit 100 downstream of the valves 105 and 106 and 109 and upstream of the valve 107 that are at the low circuit pressure but above the pressure in the reservoir 101.

When the circuit 100 is in an at rest or ready to start condition, the accumulators 102 and 103 are at a minimum hydraulic fluid volume and a maximum gas volume condition or configuration. In this condition, the low pressure side 100b of the circuit 100 is at a first predetermined low pressure side hydraulic fluid volume and the high pressure side 100a of the circuit 100 is at a first predetermined high pressure side hydraulic fluid volume. When the engine of the vehicle is started the pump 108 flows fluid from the atmospheric reservoir 101 into the low pressure side 100b of the circuit 100 for about 1 minute. This charges the low pressure side 100b and adds about 1 pint of hydraulic fluid to the low pressure side and moves the low pressure reservoir to a maximum hydraulic fluid volume condition. This results in the low pressure side 100b of the hydraulic circuit 100 being at a second predetermined low pressure side hydraulic fluid volume, which is greater than the first predetermined low pressure side hydraulic fluid volume. Also at start up, other hydraulic pumps (not shown) pump up the high pressure accumulators 102, to move the high pressure accumulators 102 toward a maximum hydraulic fluid volume condition. This results in the high pressure side 100a of the hydraulic circuit 100 being at a second predetermined high pressure side hydraulic fluid volume, which is greater than the first predetermined high pressure side hydraulic fluid volume.

When the vehicle is shut down, the bleed down valve 105 is opened such as by an electrical signal, and fluid flows from the high pressure accumulators 102 of the high pressure side 100a to the low pressure side 100b including the piston reservoir 103. This tends to increase the volume in the low pressure side 100b to slightly more increased fluid under this condition than the low pressure piston accumulator 103 can contain. This causes the low pressure accumulator 103 to bottom out and the pressure in the low pressure side 100b of the circuit 100 to rise. When this pressure rises above the low pressure relief valve 107 setting (for example, 120 psi), fluid is drained from the low pressure side 100b across the valve 107 into the atmospheric reservoir 101. When the hydraulic fluid flows into the reservoir 101, the pressure drop causes gas that is dissolved or entrained in the fluid to bubble out of the fluid, removing gas from the hydraulic fluid of the hydraulic circuit 100. The gas that is removed from the hydraulic fluid vents from the atmospheric reservoir 101. By bleeding down the high pressure fluid from the high pressure side 100a through the bleed down valve 105 to the low pressure side 100b and then flowing the fluid from the low pressure side 100b through the restricted flow low pressure relief valve 107 to the reservoir 101, appropriate control of the fluid flow and de-aeration during shut down is achieved. The cycle will repeat when the vehicle is restarted.

Figure 2:
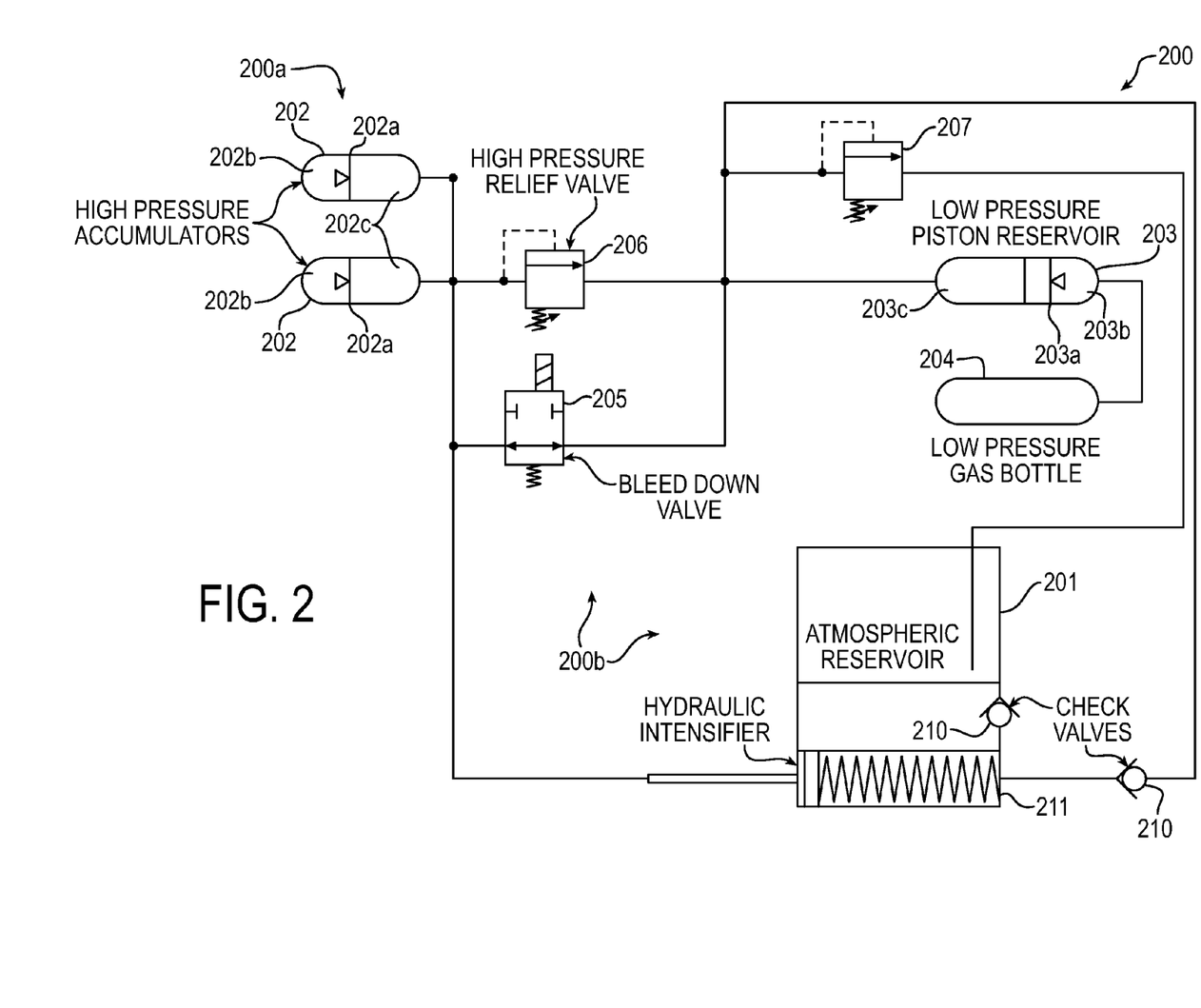
FIG. 2 is a schematic diagram of a second embodiment of a hydraulic circuit of the present invention.

FIG. 2 illustrates an alternative or second embodiment 200 of a hydraulic circuit according to the invention. Reference numbers from FIG. 1 are used in FIG. 2, but with 100 added to the FIG. 1 reference numbers, to designate the same components as used in FIG. 1 and described above in structure and method of operation. The circuit 200 also includes check valves 210 and a pressure intensifier 211. The structure and operation of the pressure intensifier 211 are further described below with reference to FIG. 8. When the vehicle is first started, the circuit 200 operates as described above in connection with circuit 100, with the exception that the pressure intensifier 211 illustrated schematically in FIG. 2 replaces the pump 108 of the circuit 100. The pressure in the high pressure side or portion of the circuit 200 forces the piston of the pressure intensifier 211 to the right to pump hydraulic fluid into the low pressure side or portion of the circuit or system 200. This adds a little more hydraulic fluid into the low pressure side of the circuit 200, in the same manner as the pump 108 in the circuit 100 adds additional hydraulic fluid volume to the low pressure side of the circuit 100. When the vehicle is shut down, the circuit 200 removes gas from the hydraulic fluid in the same manner as the circuit 100. The intensifier 211 is located lower in the vehicle than the low pressure gas bottle 204 and low pressure accumulator 203, so gravity causes the hydraulic fluid to flow from the reservoir 201 into the right side of the intensifier 211 when the circuit 200 is in its first or ready to start condition. Also, when the pressure in the high pressure of the circuit 200 completes its bleed down process and is at low pressure, the spring in the hydraulic intensifier 211 described below returns the piston of the hydraulic intensifier 211 to the left to its initial position and fluid from the atmospheric reservoir 201 flows into the intensifier 211. The cycle will repeat when the vehicle is restarted.

Figure 3:
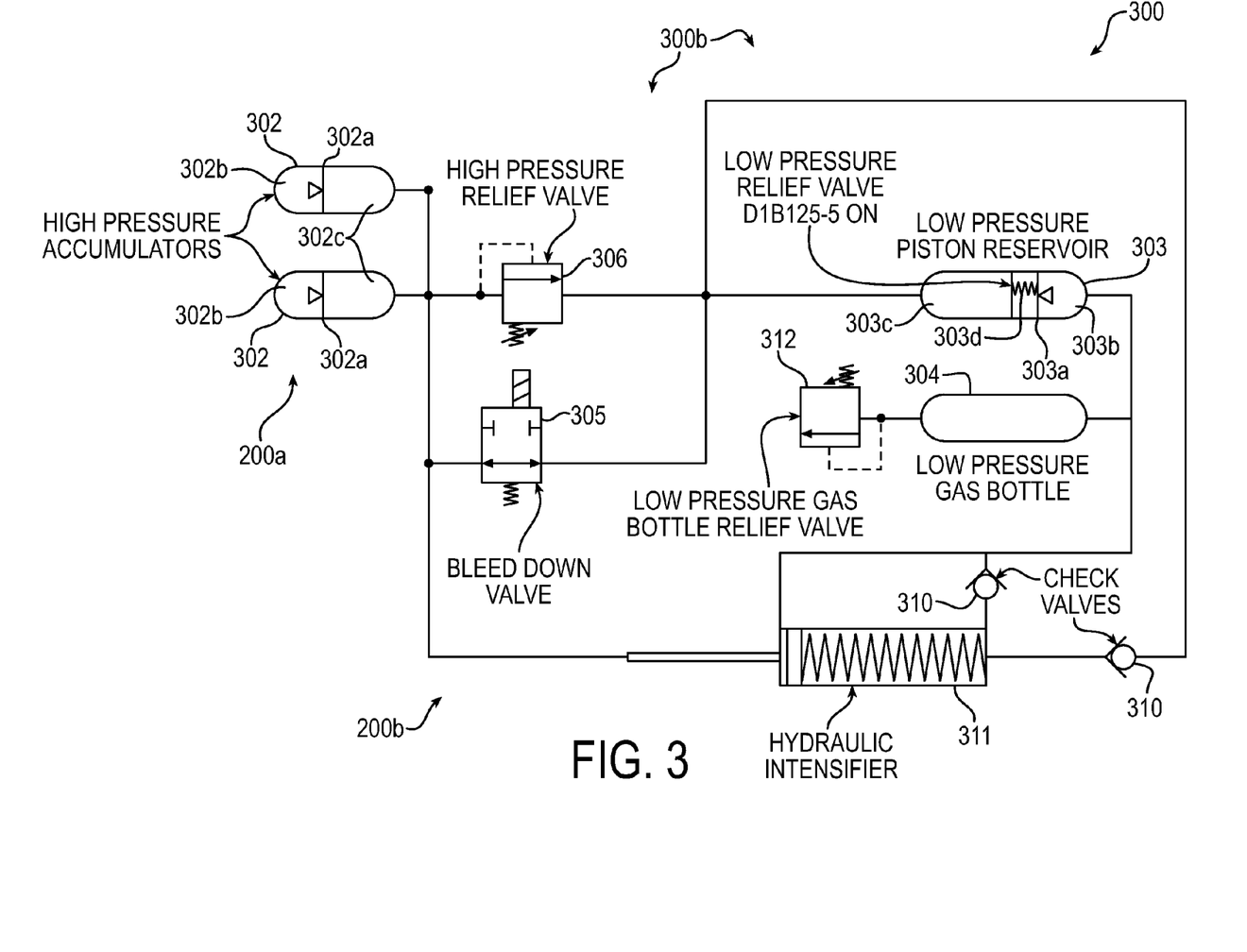
FIG. 3 is a schematic diagram of a third embodiment of a hydraulic circuit of the present invention.

FIG. 3 illustrates an alternative or third embodiment 300 of a hydraulic circuit according to the invention. Reference numbers from FIG. 2 are used in FIG. 3, but with 100 added to the FIG. 2 reference numbers, to designate the same components as used in FIG. 2 and described above in structure and method of operation. The FIG. 3 embodiment differs from the FIG. 2 embodiment, in that the low pressure accumulator 303 in FIG. 3 includes a low pressure relief valve 303d carried by the divider or piston 303. Valve 303d vents or flows hydraulic fluid from hydraulic side 303c to gas side 303b at shut down when bleed valve 305 is opened and the set pressure differential of the relief valve. 303d, for example 75 psi, is reached. The pressure drop of the hydraulic fluid across the valve 303d as it flows from the hydraulic side 303c to the gas side 303b at shut down when the bleed down valve 305 is opened causes gas dissolved or entrained in the hydraulic fluid to bubble out of the hydraulic fluid, in a similar manner to gas removal across relief valve 207 in the FIG. 2 embodiment. Also, the gas bottle 304 in FIG. 3 includes a relief valve 312. Gas removed from the hydraulic fluid flows into the gas bottle 304 and is vented through relief valve 312. The intensifier 311 is located lower in the vehicle than the low pressure accumulator 303 and gas bottle 304, so that gravity causes the hydraulic fluid that flows into the gas side 303b of the accumulator 303 to flow into the right side of the intensifier 311.

Figure 4:
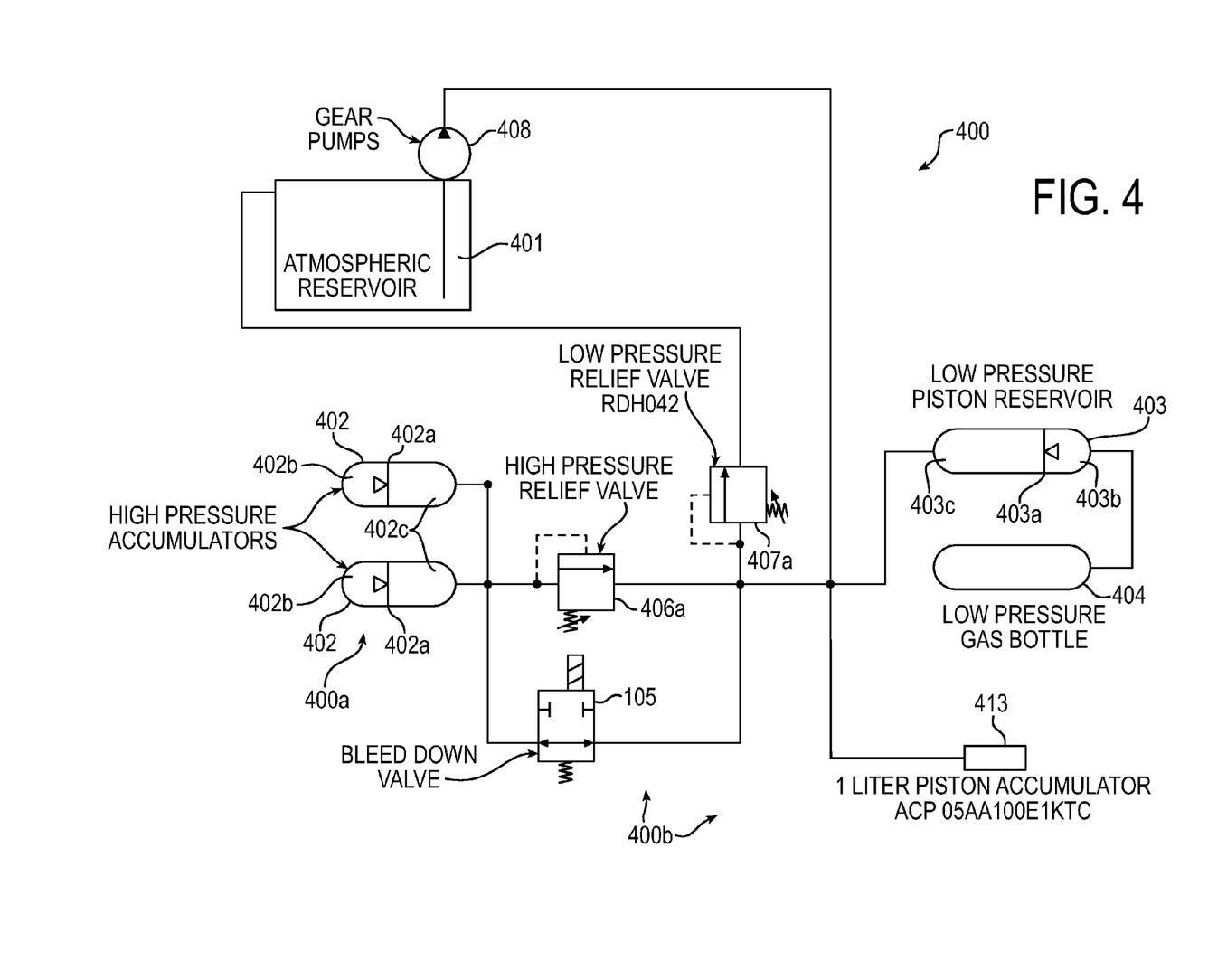
FIG. 4 is a schematic diagram of a fourth embodiment of a hydraulic circuit of the present invention.

FIG. 4 illustrates an alternative or fourth embodiment 400 of a hydraulic circuit according to the invention. Reference numbers from FIG. 1 are used in FIG. 4, but with 300 added to the FIG. 1 reference numbers, to designate the same components as used in FIG. 1 and described above in structure and method of operation. The FIG. 4 embodiment differs from the FIG. 1 embodiment, in that a low pressure side accumulator 413 is added to the low pressure side of the circuit 400. Also, the low pressure relief valve 107 in the FIG. 1 circuit 100 is replaced with a less costly and lower flow rate low pressure relief valve 407a in the circuit 400. Because the relief valve 407a may not have a flow capacity sufficient to flow hydraulic fluid to the reservoir 401 without over pressuring the low pressure side 400b of the circuit 400, the accumulator 413 will receive excess flow into the low pressure side 400b and prevent an over pressure condition.

Figure 5:
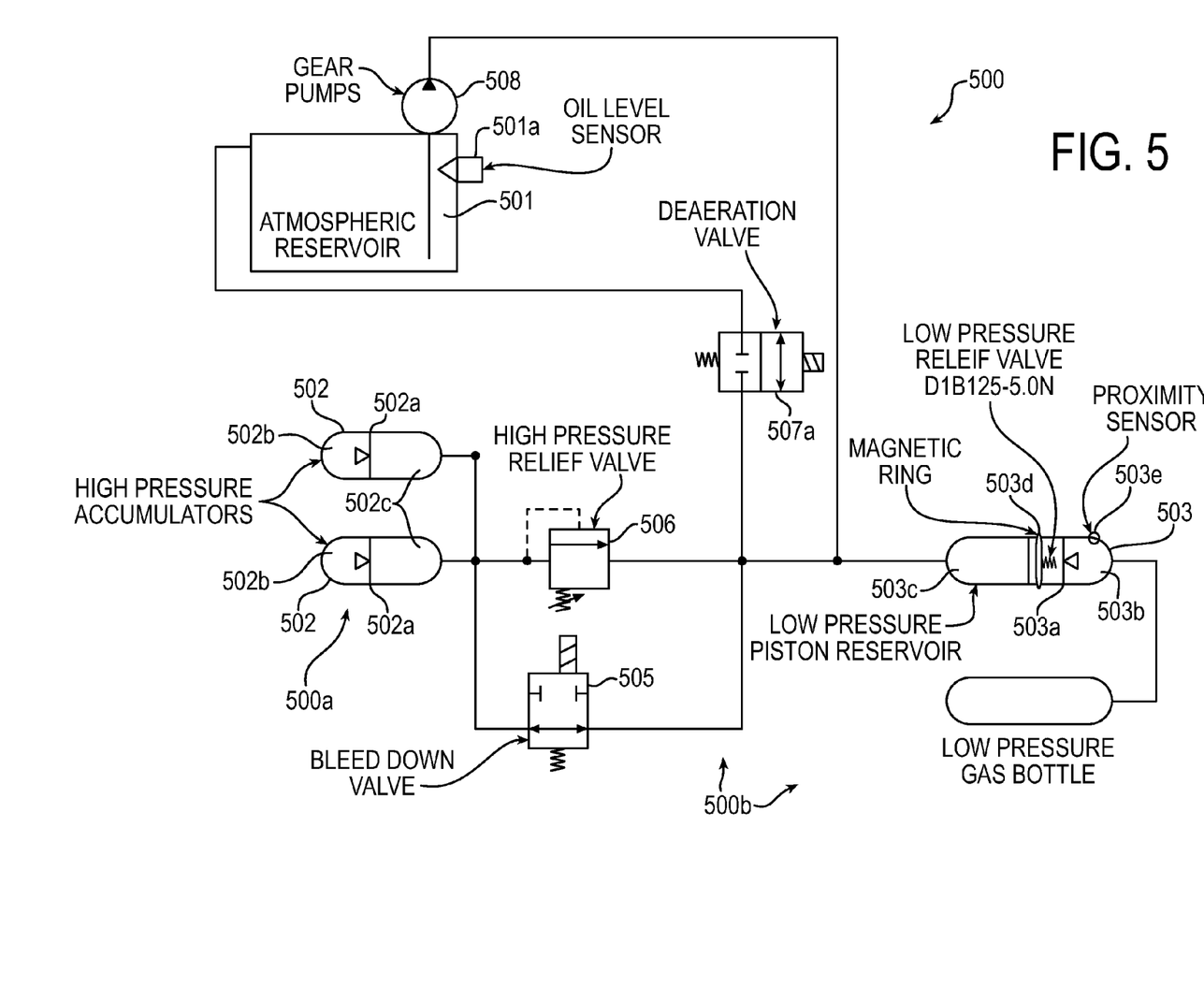
FIG. 5 is a schematic diagram of a fifth embodiment of a hydraulic circuit of the present invention.

FIG. 5 illustrates an alternative or fifth embodiment 500 of a hydraulic circuit according to the invention. Reference numbers from FIG. 1 are used in FIG. 5, but with 400 added to the FIG. 1 reference numbers, to designate the same components as used in FIG. 1 and described above in structure and method of operation. The FIG. 5 embodiment differs from the FIG. 1 embodiment, by adding a hydraulic fluid level sensor 501a to the reservoir 501, by replacing low pressure relief valve 107 with an electrically operated de-aeration valve 507a, and by adding a magnetic ring proximity sensor 503d and a full stroke proximity sensor 503e to the accumulator 503. The FIG. 5 embodiment provides an electrical version of the circuit 100 illustrated in FIG. 1. When divider or piston 503a reaches magnetic ring or position sensor 503d, the circuit 500 senses that the low pressure side volume of hydraulic fluid is at its first or minimum predetermined volume and that de-aerating valve 507a should be closed. When the vehicle is shut down, the bleed down valve 505 is opened in the same manner as described above with reference to the circuit 100 of FIG. 1 to cause the separator or divider 503a to move to the right. When the divider 503a reaches the proximity sensor 503e, this causes an electric signal to open the de-aerating valve 507a. Flow across the de-aerating valve 507a removes gas from the hydraulic fluid during this mode of operation, in the same manner as flow across valve 107 removes air as described above. When sensor 501a detects that hydraulic fluid level in reservoir 501 has reached a proper level, a signal from sensor 501a causes closing of the valve 507a.

Figure 6:
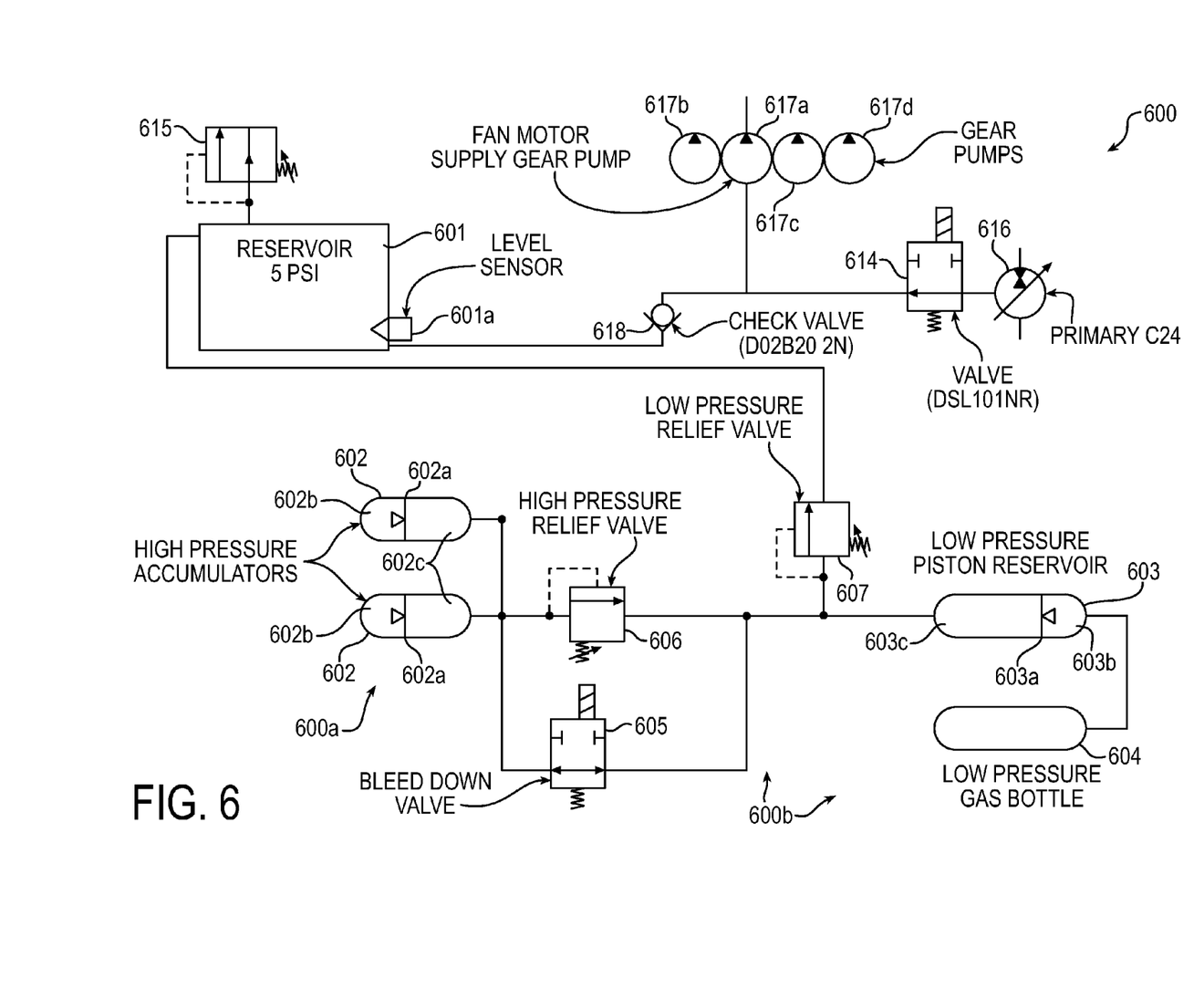
FIG. 6 is a schematic diagram of a sixth embodiment of a hydraulic circuit of the present invention.

FIG. 6 illustrates an alternative or sixth embodiment 600 of a hydraulic circuit according to the invention. Reference numbers from FIG. 1 are used in FIG. 6, but with 500 added to the FIG. 1 reference numbers, to designate the same components as used in FIG. 1 and described above in structure and method of operation. The FIG. 6 embodiment differs from the FIG. 1 embodiment, in that the circuit 600 of FIG. 6 adds a low hydraulic fluid level sensor 601a to reservoir 601 an electrically operated switching valve 614, a low pressure air relief valve 615, a primary hydraulic pump 616, hydraulic pumps 617a through 617d that are preferably driven by the prime mover engine of the vehicle, and a check valve 618. The reservoir 601 is not an atmospheric reservoir as in FIG. 1, but instead is a low pressure reservoir maintained at a positive pressure of, for example, 5 psi. This eliminates the potential of ingress of dust or other contamination into the circuit 600 from the atmosphere. This also allows use of an existing mechanical gear pump 617 on the vehicle to charge the low pressure accumulator at start up, since the pump 617 requires a positive pressure at its inlet to prevent cavitation. The relief valve 615 maintains the positive pressure of 5 psi in the reservoir 601. If sensor 601a detects a low hydraulic fluid level in reservoir 601, it causes a signal to be sent to operate switching valve 614 to move to the position illustrated in FIG. 6 so that a separate hydraulic pump 616, for example the primary pump for the hydromechanical transmission of the vehicle, to provide hydraulic fluid to the inlet of pump 617a so that pump 617a does decrease the volume of fluid in reservoir 601 below the level detected by sensor 601a.

Figure 7:
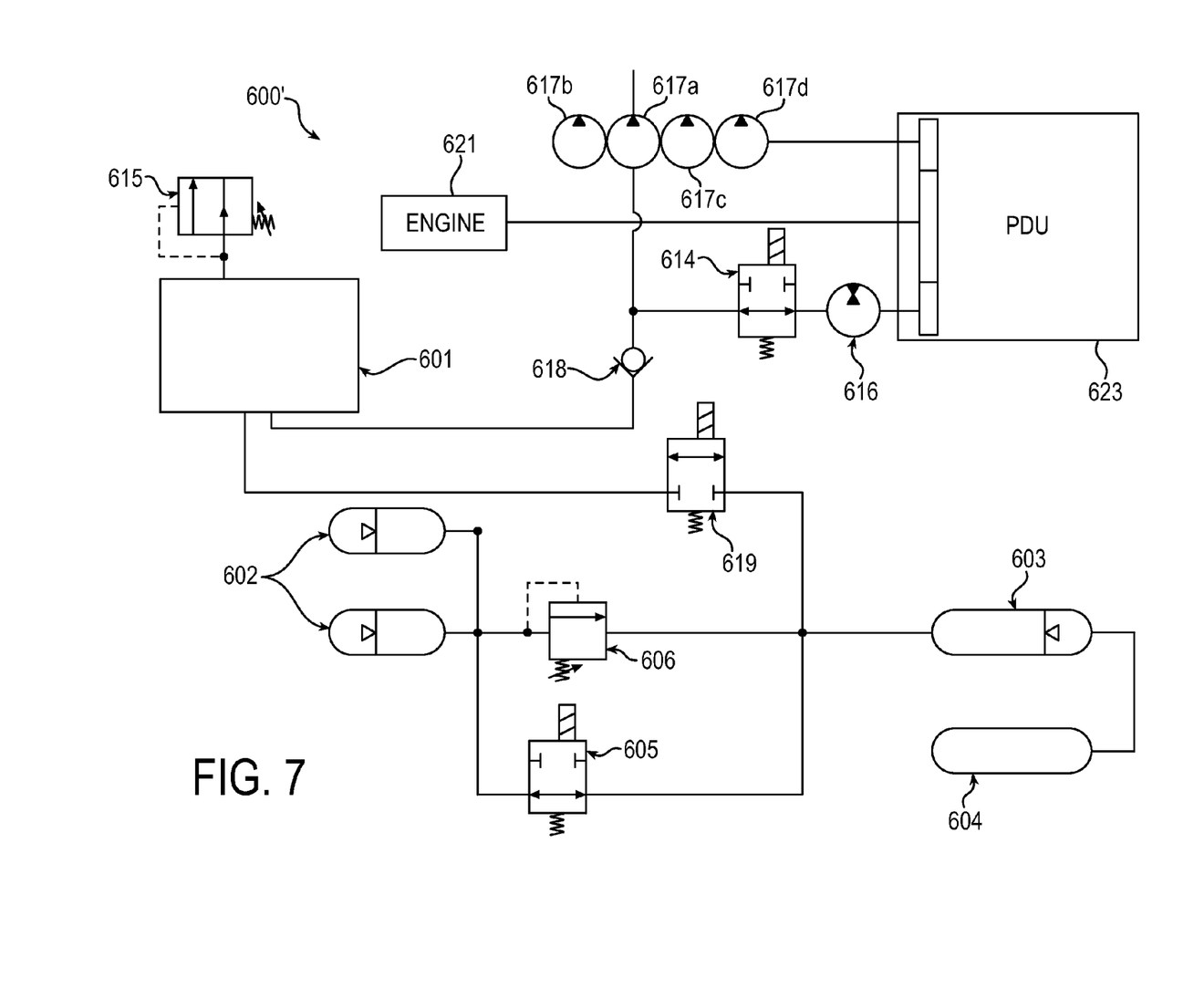
FIG. 7 is a schematic diagram of a sixth embodiment of a hydraulic circuit of the present invention.

FIG. 7 illustrates a variation of the sixth embodiment 600 of a hydraulic circuit according to the invention designated 600'. Reference numbers from FIG. 6 are used in FIG. 7 to designate the same components as used in FIG. 6 and described above in structure and method of operation. The FIG. 7 embodiment differs from the FIG. 6 embodiment, in that the circuit 600' of FIG. 7 has an electronically controlled de-aeration valve 619 in place of the low pressure relief valve 607. The electronically controlled De-Aeration Valve 619 can be used to bleed the fluid at any time the vehicle is in operation and provides better control of the de-aeration event. The electronic controls required are more complicated than a simple mechanical system. The engine 621 and the power drive unit 623 are also shown in FIG. 7.

Figure 8:
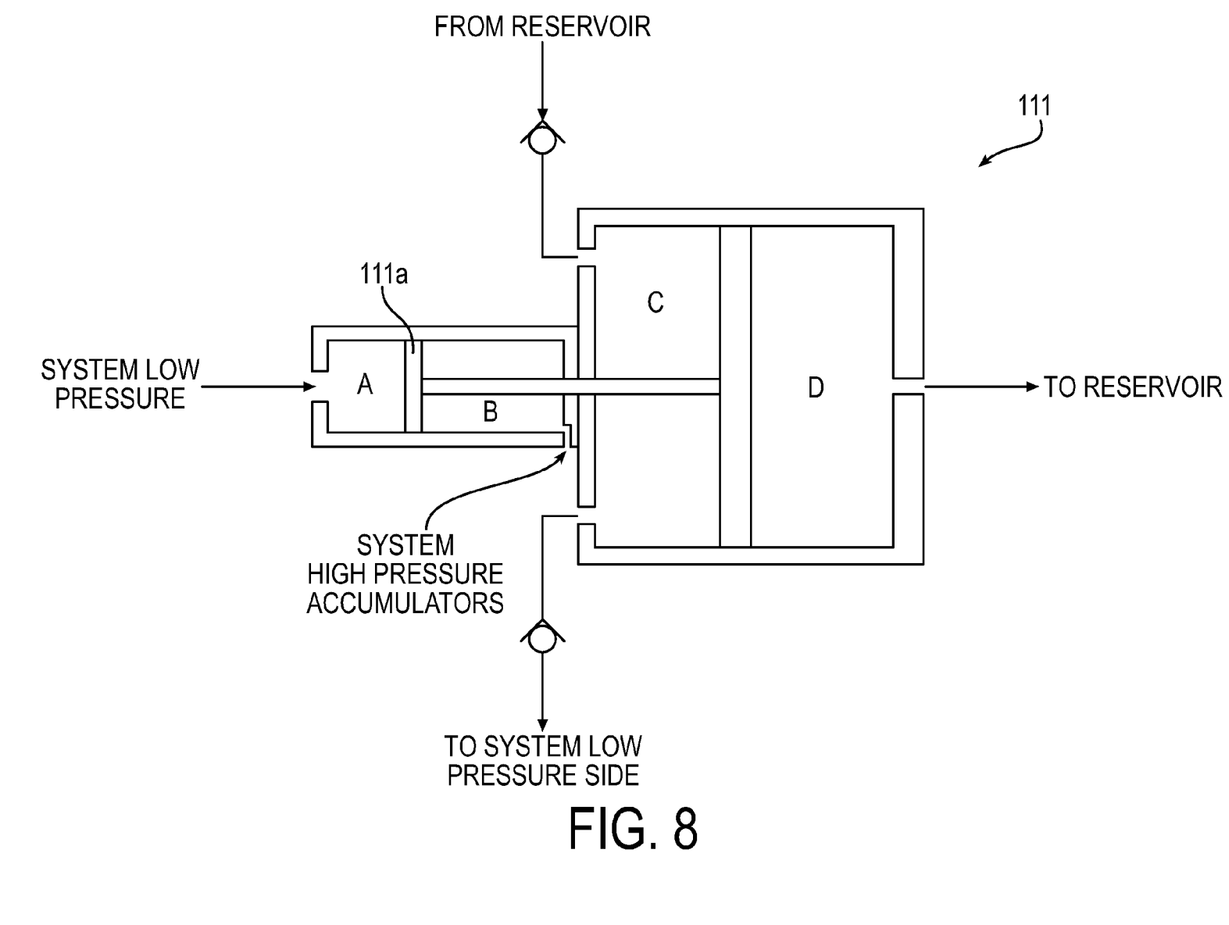
FIG. 8 is a schematic illustration of a hydraulic intensifier that may be used in the second and third embodiments of the present invention illustrated in FIGS. 2 and 3.

FIG. 8 illustrates a pressure intensifier 111 that may be used in place of the conventional spring type intensifiers 211 and 311 in the circuits 200 and 300 illustrated in FIGS. 2 and 3. This hydraulic intensifier 111 will fill the low pressure side 200b or 300b with a known amount of fluid without the need for electronic controls. When the hydraulic circuits 200 and 300 are shut down, the circuit high pressure and system low pressure are equal. The pressure in chambers A and B will be equal at a pressure equal to the low pressure pre-charge from gas bottle 204 or 304 (about 70 psi). Because the cross sectional area of piston 111a in chamber A is larger than the cross sectional area of piston 111a exposed to pressure in chamber B, the piston 111a will move to the right. This will draw fluid from the reservoir into chamber C and discharge fluid into the reservoir from chamber D. When the vehicle is started the system high pressure will go to above 2700 psi. This high pressure in chamber B will cause the piston 111a to move to the left, pumping the fluid in chamber C into the low pressure side 200b or 300b of the circuits 200 or 300 and causing the low pressure side hydraulic fluid volume to increase from its first predetermined level to its second predetermined level as explained above with reference to FIG. 1. This action accomplishes the same purpose as the electric pump 108 in the circuit 100 illustrated in FIG. 1.

Presently preferred embodiments of the invention are shown and described in detail above. The invention is not, however, limited to these specific embodiments. Various changes and modifications can be made to this invention without departing from its teachings, and the scope of this invention is defined by the claims set out below. Further, separate components illustrated in the drawings may be combined into a single component, and single components may be provided as multiple parts.

The invention claimed is:

1. A hydraulic circuit comprising:
a hydraulic fluid reservoir;
a high pressure side;
a low pressure side;
a bleed down valve between the high pressure side and the low pressure side, the bleed down valve having a closed position and an opened position;
a de-aerating valve between the low pressure side and the reservoir, the de-aerating valve having a closed position and an opened position;
and opening the bleed down valve causing fluid to flow from the high pressure side to the low pressure side and through the de-aerating valve to the reservoir.

2. The hydraulic circuit of claim 1, the high pressure side including a high pressure accumulator.

3. The hydraulic circuit of claim 1, the low pressure side including a low pressure accumulator.

4. The hydraulic circuit of claim 1, including a device to charge the low pressure side and to move the low pressure side from a first predetermined hydraulic fluid volume to a second predetermined hydraulic fluid volume that is greater than the first predetermined hydraulic fluid volume.

5. The hydraulic circuit of claim 4, wherein the device is a hydraulic pump.

6. The hydraulic circuit of claim 4, wherein the device is a hydraulic pressure intensifier.

7. The hydraulic circuit of claim 3, wherein the low pressure accumulator includes a divider separating the low pressure accumulator into a hydraulic side and a gas side, and a pressure relief valve carried by the divider.

8. The hydraulic circuit of claim 1, including a hydraulic fluid level sensor associated with the reservoir.

9. The hydraulic circuit of claim 1, wherein the reservoir is maintained at a positive pressure during operation.

10. A hydraulic circuit comprising:
a hydraulic fluid reservoir;
a high pressure side having a high pressure accumulator;
a low pressure side having a low pressure accumulator, a first predetermined volume of hydraulic fluid in a first configuration and a second predetermined volume of hydraulic fluid in a second configuration, the second predetermined volume being substantially greater than the first predetermined volume;
a bleed down valve between the high pressure accumulator and the low pressure accumulator, the bleed down valve having a closed position and an opened position;
a de-aerating valve between the low pressure side and the reservoir, the de-aerating valve having a closed position and a restricted opened position;
and opening the bleed down valve causing the low pressure side to maintain its second predetermined position and causing fluid to flow from the high pressure accumulator to the low pressure side and from the low pressure side through the de-aerating valve to the reservoir.

11. The hydraulic circuit of claim 10, including a device to charge the low pressure side and to move the low pressure side from its first configuration to its second configuration.

12. The hydraulic circuit of claim 11, wherein the device is a hydraulic pump.

13. The hydraulic circuit of claim 11, wherein the device is a hydraulic pressure intensifier.

14. The hydraulic circuit of any of claim 10, wherein the low pressure accumulator includes a divider separating the low pressure accumulator into a hydraulic side and a gas side, and a pressure relief valve carried by the divider.

15. The hydraulic circuit of claim 10, including a hydraulic fluid level sensor associated with the reservoir.

16. The hydraulic circuit of claim 10, wherein the reservoir is maintained at a positive pressure during operation.

17. A method of charging and deaerating hydraulic fluid comprising the steps of:
    providing a hydraulic circuit having a high pressure side and a low pressure side;
    filling the low pressure side of the hydraulic circuit to a maximum fluid volume level;
    bleeding fluid flow from the high pressure side of the hydraulic circuit to the low pressure side to tend to increase the volume of hydraulic fluid in the low pressure side above its maximum fluid volume level; and
    flowing the excess hydraulic fluid from the low pressure side through a restricted fluid flow valve to a reservoir to de-aerate the hydraulic fluid.

18. The method of claim 17, wherein the step of providing a hydraulic circuit having a high pressure side and a low pressure side includes providing a high pressure accumulator on the high pressure side and a low pressure accumulator on the low pressure side.

19. The method of claim 17, further including the step of charging the low pressure side to move the low pressure side from its first configuration to its second configuration.

20. The method of claim 19, wherein the step of charging the low pressure side to move the low pressure side from its first configuration to its second configuration is accomplished by providing a pump or a hydraulic pressure intensifier.

\* \* \* \* \*